US012341261B2

(12) United States Patent
Chang et al.

(10) Patent No.: US 12,341,261 B2
(45) Date of Patent: Jun. 24, 2025

(54) MOBILE DEVICE SUPPORTING WIDEBAND OPERATION

(71) Applicant: Acer Incorporated, New Taipei (TW)

(72) Inventors: Kun-Sheng Chang, New Taipei (TW); Ching-Chi Lin, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 169 days.

(21) Appl. No.: 18/366,158

(22) Filed: Aug. 7, 2023

(65) Prior Publication Data

US 2024/0380109 A1 Nov. 14, 2024

(30) Foreign Application Priority Data

May 11, 2023 (TW) ................................ 112117456

(51) Int. Cl.
*H01Q 5/371* (2015.01)
*H01Q 1/22* (2006.01)
*H01Q 1/48* (2006.01)

(52) U.S. Cl.
CPC ........... *H01Q 5/371* (2015.01); *H01Q 1/2266* (2013.01); *H01Q 1/48* (2013.01)

(58) Field of Classification Search
CPC .......... H01Q 5/20; H01Q 5/307; H01Q 5/371; H01Q 1/2266; H01Q 1/38; H01Q 1/48
See application file for complete search history.

(56) References Cited

U.S. PATENT DOCUMENTS

| | | | | |
|---|---|---|---|---|
| 2018/0048076 A1* | 2/2018 | Wei | ........................ | H01Q 21/30 |
| 2020/0168993 A1* | 5/2020 | Wei | .......................... | H01Q 1/24 |
| 2023/0231310 A1* | 7/2023 | Zhang | .................... | H01Q 9/045 343/848 |

* cited by examiner

*Primary Examiner* — Daniel Munoz
(74) *Attorney, Agent, or Firm* — McClure, Qualey & Rodack, LLP

(57) ABSTRACT

A mobile device includes a ground element, a first radiation element, a second radiation element, a third radiation element, an extension ground element, a fourth radiation element, and a fifth radiation element. The ground element has a notch region. The first radiation element has a feeding point. The second radiation element is coupled to the first radiation element. The first radiation element is coupled through the third radiation element to the ground element. The extension ground element is coupled to the ground element. The fourth radiation element is coupled to the extension ground element. The fifth radiation element is coupled to the extension ground element. An antenna structure is formed by the ground element, the first radiation element, the second radiation element, the third radiation element, the extension ground element, the fourth radiation element, and the fifth radiation element.

15 Claims, 3 Drawing Sheets

MOBILE DEVICE SUPPORTING WIDEBAND OPERATION

CROSS REFERENCE TO RELATED APPLICATIONS

This application claims priority of Taiwan Patent Application No. 112117456 filed on May 11, 2023, the entirety of which is incorporated by reference herein.

BACKGROUND OF THE INVENTION

Field of the Invention

The disclosure generally relates to a mobile device, and more particularly, to a mobile device supporting wideband operations.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

Antennas are indispensable elements for wireless communication. If an antenna for signal reception and transmission has insufficient radiation gain, it may degrade the communication quality of the relative mobile device. Accordingly, it has become a critical challenge for designers to design a small-size and high-gain antenna structure.

BRIEF SUMMARY OF THE INVENTION

In an exemplary embodiment, the invention is directed to a mobile device supporting wideband operations. The mobile device includes a ground element, a first radiation element, a second radiation element, a third radiation element, an extension ground element, a fourth radiation element, and a fifth radiation element. The ground element has a notch region. The first radiation element has a feeding point. The second radiation element is coupled to the first radiation element. The first radiation element is coupled through the third radiation element to the ground element. The extension ground element is coupled to the ground element. The fourth radiation element is coupled to the extension ground element. A first coupling gap is formed between the fourth radiation element and the first radiation element. The fifth radiation element is coupled to the extension ground element. A second coupling gap is formed between the fifth radiation element and the first radiation element. An antenna structure is formed by the ground element, the first radiation element, the second radiation element, the third radiation element, the extension ground element, the fourth radiation element, and the fifth radiation element.

In some embodiments, the mobile device further includes a dielectric substrate. The first radiation element, the second radiation element, the third radiation element, the extension ground element, the fourth radiation element, and the fifth radiation element are all disposed on the dielectric substrate.

In some embodiments, the ground element includes a first main portion, a second main portion, and a connection portion. The notch region is positioned between the first main portion and the second main portion. The feeding point is adjacent to the first main portion.

In some embodiments, the combination of the first radiation element, the second radiation element, and the third radiation element substantially has a T-shape.

In some embodiments, the combination of the extension ground element, the fourth radiation element, and the fifth radiation element substantially has an L-shape.

In some embodiments, a third coupling gap is formed between the fourth radiation element and the ground element. The width of the third coupling gap is from 0.5 mm to 1 mm.

In some embodiments, the antenna structure covers a first frequency band, a second frequency band, and a third frequency band. The first frequency band is from 2400 MHz to 2500 MHz. The second frequency band is from 5150 MHz to 5850 MHz. The third frequency band is from 5925 MHz to 7125 MHz.

In some embodiments, the total length of the first radiation element and the second radiation element is substantially equal to 0.5 wavelength of the first frequency band.

In some embodiments, the total length of the first radiation element and the third radiation element is substantially equal to 0.25 wavelength of the second frequency band.

In some embodiments, the length of each of the fourth radiation element and the fifth radiation element is substantially equal to 0.25 wavelength of the third frequency band.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
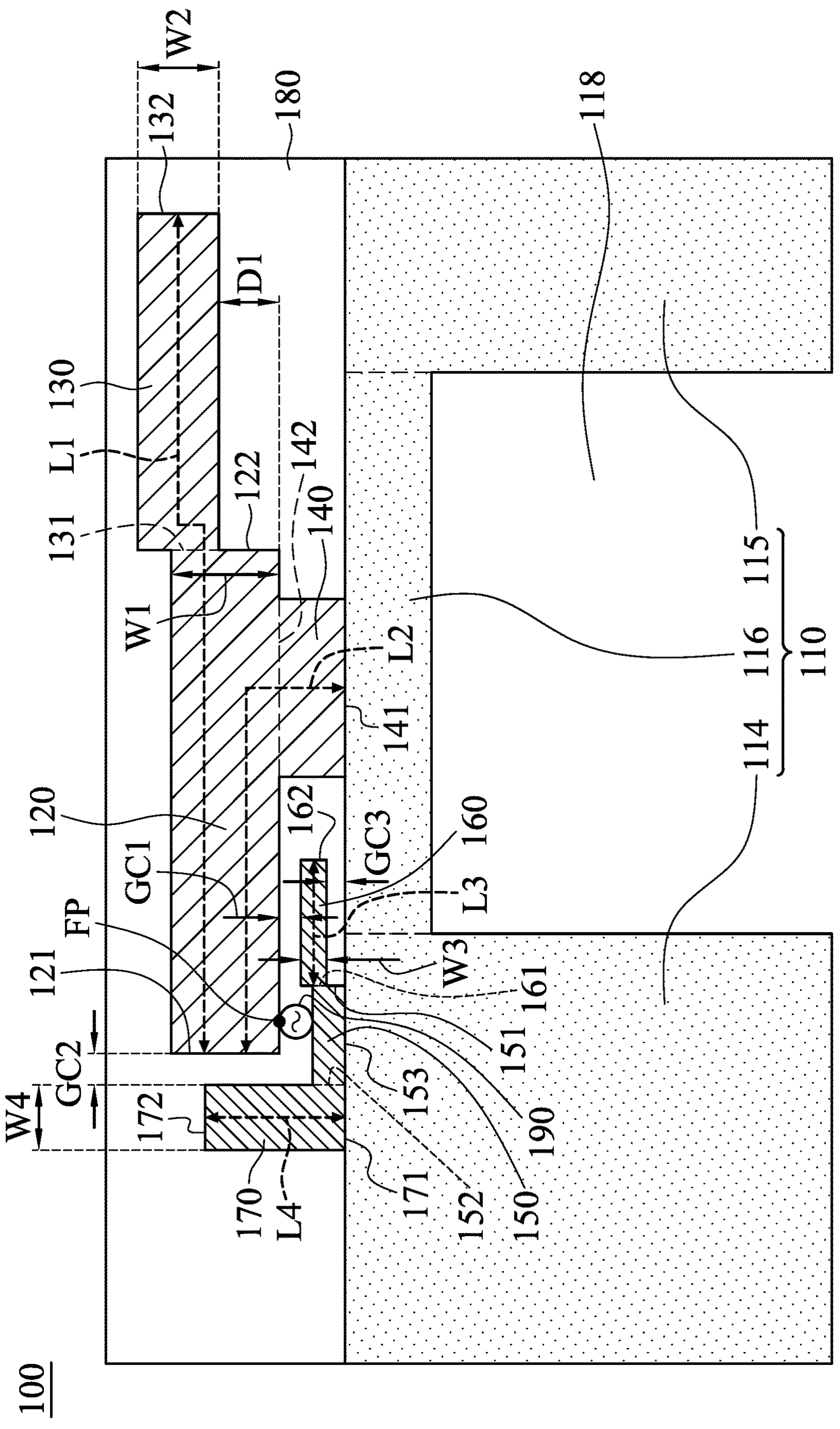
FIG. 1 is a top view of a mobile device according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms “include” and “comprise” are used in an open-ended fashion, and thus should be interpreted to mean “include, but not limited to . . . ”. The term “substantially” means the value is within an acceptable error range. One skilled in the art can solve the technical problem within a predetermined error range and achieve the proposed technical performance. Also, the term “couple” is intended to mean either an indirect or direct electrical connection.

Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a top view of a mobile device 100 according to an embodiment of the invention. For example, the mobile device 100 may be a smartphone, a tablet computer, or a notebook computer, but it is not limited thereto. In the embodiment of FIG. 1, the mobile device 100 at least includes a ground element 110, a first radiation element 120, a second radiation element 130, a third radiation element 140, an extension ground element 150, a fourth radiation element 160, and a fifth radiation element 170. The ground element 110, the first radiation element 120, the second radiation element 130, the third radiation element 140, the extension ground element 150, the fourth radiation element 160, and the fifth radiation element 170 may all made of metal materials, such as copper, silver, aluminum, iron, or their alloys. It should be understood that the mobile device 100 may further include other components, such as a processor, a touch control panel, a speaker, a power supply module, and/or a housing, although they are not displayed in FIG. 1.

The ground element 110 has a notch region 118. For example, the ground element 110 may substantially have an inverted U-shape, and the notch region 118 may substantially have a rectangular shape, but they are not limited thereto. Specifically, the ground element 110 includes a first main portion 114, a second main portion 115, and a connection portion 116. The connection portion 116 is coupled between the first main portion 114 and the second main portion 115. In addition, the notch region 118 may be positioned between the first main portion 114 and the second main portion 115 of the ground element 110. For example, among the ground element 110, the area of the first main portion 114 may be larger than that of the second main portion 115, and the area of the second main portion 115 may be larger than that of the connection portion 116. In some embodiments, the ground element 110 is implemented with a ground copper foil, which may be further coupled to a system ground plane (not shown) of the mobile device 100.

The first radiation element 120 may substantially have a relatively wide straight-line shape (in comparison to the second radiation element 130). Specifically, the first radiation element 120 has a first end 121 and a second end 122. The first end 121 of the first radiation element 120 is an open end. A feeding point FP is adjacent to the first end 121 of the first radiation element 120. The feeding point FP may be further coupled to a signal source 190. For example, the signal source 190 may be an RF (Radio Frequency) module. It should be noted that the term "adjacent" or "close" over the disclosure means that the distance (spacing) between two corresponding elements is smaller than a predetermined distance (e.g., 10 mm or the shorter), or means that the two corresponding elements directly touch each other (i.e., the aforementioned distance/spacing between them is reduced to 0). In some embodiments, the feeding point FP is disposed adjacent to the first main portion 114 of the ground element 110, and the feeding point FP is relatively away from the notch region 118 of the ground element 110.

The second radiation element 130 may substantially have a straight-line shape. Specifically, the second radiation element 130 has a first end 131 and a second end 132. The first end 131 of the second radiation element 130 is coupled to the second end 122 of the first radiation element 120. The first end 132 of the second radiation element 130 is an open end. For example, the second end 132 of the second radiation element 130 and the first end 121 of the first radiation element 120 may substantially extend in opposite directions and away from each other. In some embodiments, the second radiation element 130 is moved upwardly by a predetermined distance D1 in comparison to the aforementioned first radiation element 120, but it is not limited thereto.

For example, the combination of the first radiation element 120, the second radiation element 130, and the third radiation element 140 may substantially have a T-shape. Specifically, the third radiation element 140 has a first end 141 and a second end 142. The first end 141 of the third radiation element 140 is coupled to the connection portion 116 of the ground element 110. The second end 142 of the third radiation element 140 is coupled to the second end 122 of the first radiation element 120. Thus, the first radiation element 120 is coupled through the third radiation element 140 to the ground element 110.

The extension ground element 150 has a first end 151, a second end 152, and a side 153. The side 153 of the extension ground element 150 is coupled to the first main portion 114 of the ground element 110. For example, a positive electrode of the signal source 190 may be coupled to the feeding point FP, and a negative electrode of the signal source 190 may be coupled to the extension ground element 150, but they are not limited thereto.

The fourth radiation element 160 may substantially have a relatively narrow straight-line shape (in comparison to the fifth radiation element 170). Specifically, the fourth radiation element 160 has a first end 161 and a second end 162. The first end 161 of the fourth radiation element 160 is coupled to the first end 151 of the extension ground element 150. The second end 162 of the fourth radiation element 160 is an open end. For example, the second end 162 of the fourth radiation element 160 and the second end 132 of the second radiation element 130 may substantially extend in the same direction. In some embodiments, a first coupling gap GC1 is formed between the fourth radiation element 160 and the first radiation element 120.

For example, the combination of the extension ground element 150, the fourth radiation element 160, and the fifth radiation element 170 may substantially have an L-shape, which may be separate from the aforementioned T-shape. The fifth radiation element 170 may substantially have another straight-line shape, which may be substantially perpendicular to both of the extension ground element 150 and the fourth radiation element 160. Specifically, the fifth radiation element 170 has a first end 171 and a second end 172. The first end 171 of the fifth radiation element 170 is coupled to the second end 152 of the extension ground element 150 and the first main portion 114 of the ground element 110. The second end 172 of the fifth radiation element 170 is an open end. In some embodiments, a second coupling gap GC2 is formed between the fifth radiation element 170 and the first radiation element 120, and a second coupling gap GC3 is formed between the fourth radiation element 160 and the ground element 110.

In a preferred embodiment, an antenna structure of the mobile device 100 is formed by the ground element 110, the first radiation element 120, the second radiation element 130, the third radiation element 140, the extension ground element 150, the fourth radiation element 160, and the fifth radiation element 170. For example, the aforementioned antenna structure may be a planar antenna structure. However, the invention is not limited thereto. In alternative embodiments, the antenna structure of the mobile device 100 is modified to a 3D (Three Dimensional) antenna structure.

In some embodiments, the mobile device 100 further includes a dielectric substrate 180. The dielectric substrate 180 may be an FR4 (Flame Retardant 4) substrate, a PCB (Printed Circuit Board), or an FPC (Flexible Printed Circuit). For example, the first radiation element 120, the second radiation element 130, the third radiation element 140, the extension ground element 150, the fourth radiation element 160, and the fifth radiation element 170 are all disposed on the same surface of the dielectric substrate 180.

Figure 2:
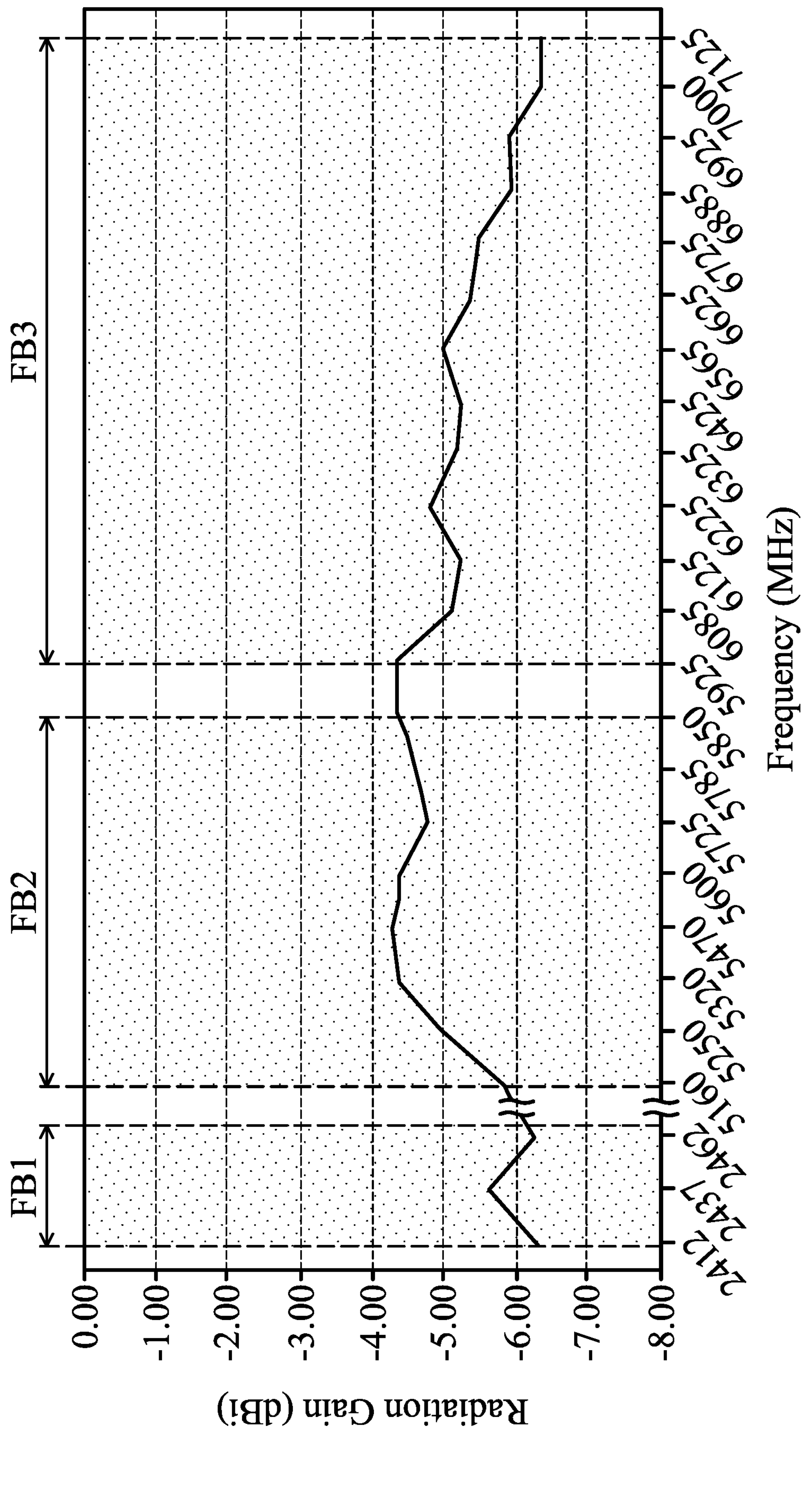
FIG. 2 is a diagram of radiation gain of an antenna structure of a mobile device according to an embodiment of the invention.

FIG. 2 is a diagram of radiation gain of the antenna structure of the mobile device 100 according to an embodiment of the invention. The horizontal axis represents the operational frequency (MHz), and the vertical axis represents the radiation gain (dBi). According to the measurement of FIG. 2, the antenna structure of the mobile device 100 can cover a first frequency band FB1, a second frequency band FB2, and a third frequency band FB3. For example, the first frequency band FB1 may be from 2400 MHz to 2500 MHz, the second frequency band FB2 may be from 5150 MHz to 5850 MHz, and the third frequency band FB3 may be from 5925 MHz to 7125 MHz. Therefore, the mobile device 100 can support at least the wideband operations of the conventional WLAN (Wireless Local Area Network) and the next-generation Wi-Fi 6E. It should be noted that even if the ground element 110 is not a complete shape, the mobile device 100 using the design of the invention can still provide relatively high radiation gain within the first frequency band FB1, the second frequency band FB2, and the third frequency band FB3 as mentioned above.

In some embodiments, the operational principles of the antenna structure of the mobile device 100 will be described as follows. The first radiation element 120 and the second radiation element 130 are excited to generate the first frequency band FB1. The first radiation element 120 and the third radiation element 140 are excited to generate the second frequency band FB2. The fourth radiation element 160 and the fifth radiation element 170 are excited to generate the third frequency band FB3. According to practical measurements, if the second radiation element 130 is moved upwardly by the predetermined distance D1, it can fine-tune the impedance matching of the first frequency band FB1. Also, if the third coupling gap GC3 is added between the fourth radiation element 160 and the ground element 110, it can fine-tune the impedance matching of the third frequency band FB3.

In some embodiments, the element sizes of the mobile device 100 will be described as follows. The total length L1 of the first radiation element 120 and the second radiation element 130 may be substantially equal to 0.5 wavelength (λ/2) of the first frequency band FB1 of the antenna structure of the mobile device 100. The width W1 of the first radiation element 120 may be from 3 mm to 5 mm. The width W2 of the second radiation element 130 may be from 2 mm to 4 mm. The total length L2 of the first radiation element 120 and the third radiation element 140 may be substantially equal to 0.25 wavelength (λ/4) of the second frequency band FB2 of the antenna structure of the mobile device 100. The predetermined distance D1 may be from 1 mm to 1.5 mm. The length L3 of the fourth radiation element 160 may be substantially equal to 0.25 wavelength (λ/4) of the third frequency band FB3 of the antenna structure of the mobile device 100. The width W3 of the fourth radiation element 160 may be from 1 mm to 2 mm. The length L4 of the fifth radiation element 170 may be substantially equal to 0.25 wavelength (λ/4) of the third frequency band FB3 of the antenna structure of the mobile device 100. The width W4 of the fifth radiation element 170 may be from 2 mm to 3 mm. The width of the first coupling gap GC1 may be from 1 mm to 2 mm. The width of the second coupling gap GC2 may be from 1 mm to 2 mm. The width of the third coupling gap GC3 may be from 0.5 mm to 1 mm. The above ranges of element sizes are calculated and obtained according to many experiment results, and they help to optimize the operational bandwidth and impedance matching of the antenna structure of the mobile device 100.

Figure 3:
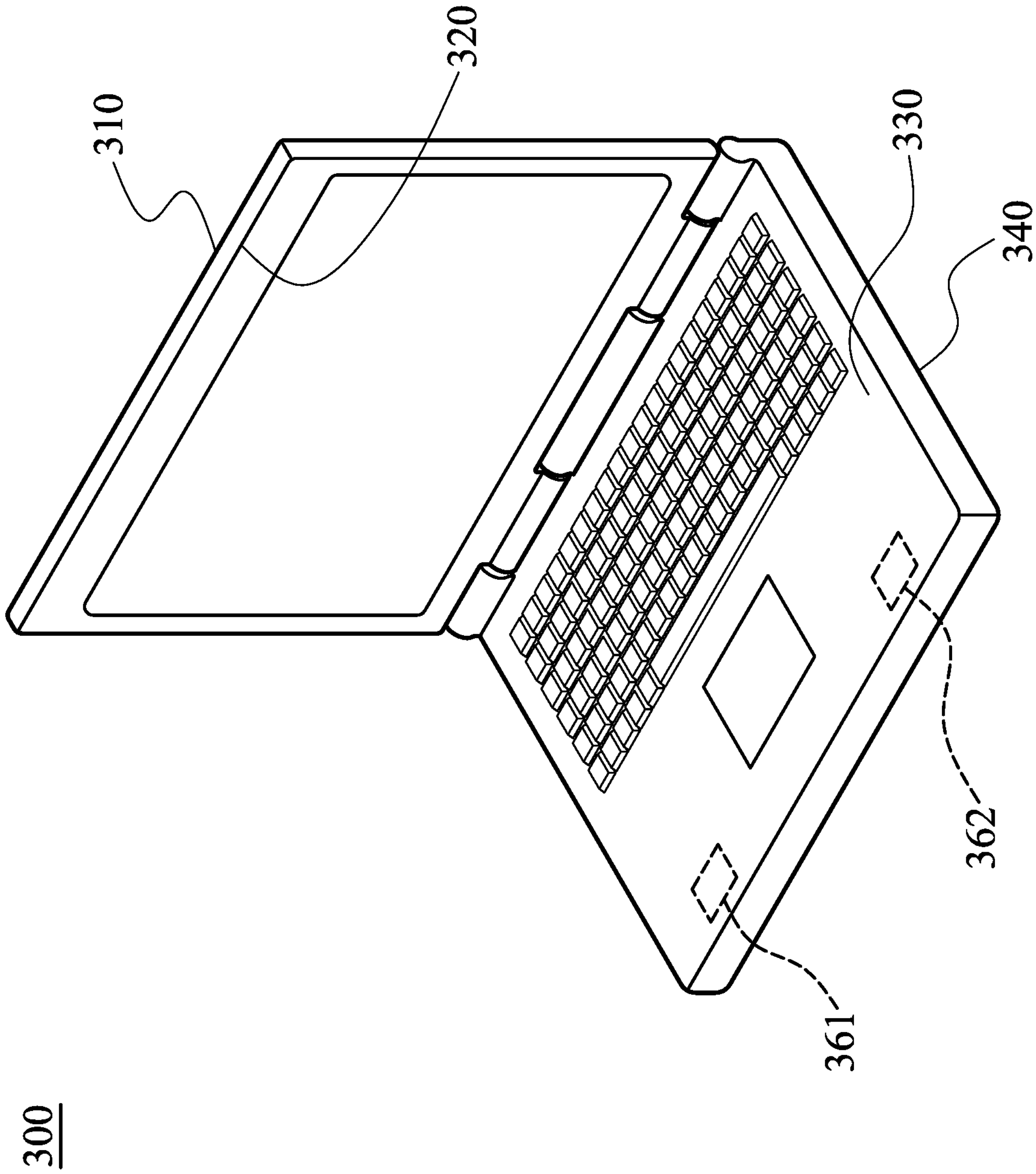
FIG. 3 is a perspective view of a notebook computer according to an embodiment of the invention.

FIG. 3 is a perspective view of a notebook computer 300 according to an embodiment of the invention. In the embodiment of FIG. 3, the aforementioned antenna structure is applied in the notebook computer 300. The notebook computer 300 includes an upper cover housing 310, a display frame 320, a keyboard frame 330, and a base housing 340. It should be understood that the upper cover housing 310, the display frame 320, the keyboard frame 330, and the base housing 340 are respectively equivalent to the so-called "A-component", "B-component", "C-component", and "D-component" in the field of notebook computers. For example, the aforementioned antenna structure may be disposed between the keyboard frame 330 and the base housing 340, and it may be also adjacent to a first position 361 or a second position 362 of the notebook computer 300. According to practical measurements, if the keyboard frame 330 is made of a metal material and an antenna window is opened on the base housing 340, the antenna structure of the notebook computer 300 can provide good communication quality.

The invention proposes a novel mobile device with a novel antenna structure. The invention has several advantages over the conventional design, including its small size, wide bandwidth, high radiation gain, and low manufacturing cost. Therefore, the invention is suitable for application in a variety of communication devices.

Note that the above element sizes, element shapes, and frequency ranges are not limitations of the invention. An antenna designer can fine-tune these settings or values according to different requirements. It should be understood that the mobile device of the invention is not limited to the configurations of FIGS. 1-3. The invention may merely include any one or more features of any one or more embodiments of FIGS. 1-3. In other words, not all of the features displayed in the figures should be implemented in the mobile device of the invention.

Use of ordinal terms such as “first”, “second”, “third”, etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A mobile device supporting wideband operations, comprising:

a ground element, having a notch region;

a first radiation element, having a feeding point;

a second radiation element, coupled to the first radiation element;

a third radiation element, wherein the first radiation element is coupled through the third radiation element to the ground element;

an extension ground element, coupled to the ground element;

a fourth radiation element, coupled to the extension ground element, wherein a first coupling gap is formed between the fourth radiation element and the first radiation element; and a fifth radiation element, coupled to the extension ground element, wherein a second coupling gap is formed between the fifth radiation element and the first radiation element;

wherein an antenna structure is formed by the ground element, the first radiation element, the second radiation element, the third radiation element, the extension ground element, the fourth radiation element, and the fifth radiation element.

2. The mobile device as claimed in claim 1, further comprising:

a dielectric substrate, wherein the first radiation element, the second radiation element, the third radiation element, the extension ground element, the fourth radiation element, and the fifth radiation element are disposed on the dielectric substrate.

3. The mobile device as claimed in claim 1, wherein the ground element comprises a first main portion, a second main portion, and a connection portion.

4. The mobile device as claimed in claim 3, wherein the notch region is positioned between the first main portion and the second main portion.

5. The mobile device as claimed in claim 3, wherein the feeding point is adjacent to the first main portion.

6. The mobile device as claimed in claim 1, wherein a combination of the first radiation element, the second radiation element, and the third radiation element substantially has a T-shape.

7. The mobile device as claimed in claim 1, wherein a combination of the extension ground element, the fourth radiation element, and the fifth radiation element substantially has an L-shape.

8. The mobile device as claimed in claim 1, wherein a width of each of the first coupling gap and the second coupling gap is from 1 mm to 2 mm.

9. The mobile device as claimed in claim 1, wherein a third coupling gap is formed between the fourth radiation element and the ground element.

10. The mobile device as claimed in claim 9, wherein a width of the third coupling gap is from 0.5 mm to 1 mm.

11. The mobile device as claimed in claim 1, wherein the antenna structure covers a first frequency band, a second frequency band, and a third frequency band.

12. The mobile device as claimed in claim 11, wherein the first frequency band is from 2400 MHz to 2500 MHz, the second frequency band is from 5150 MHz to 5850 MHz, and the third frequency band is from 5925 MHz to 7125 MHz.

13. The mobile device as claimed in claim 11, wherein a total length of the first radiation element and the second radiation element is substantially equal to 0.5 wavelength of the first frequency band.

14. The mobile device as claimed in claim 11, wherein a total length of the first radiation element and the third radiation element is substantially equal to 0.25 wavelength of the second frequency band.

15. The mobile device as claimed in claim 11, wherein a length of each of the fourth radiation element and the fifth radiation element is substantially equal to 0.25 wavelength of the third frequency band.

* * * * *